United States Patent
Balichev et al.

(10) Patent No.: US 10,486,227 B2
(45) Date of Patent: Nov. 26, 2019

(54) CASTING POWDER, CASTING SLAG AND METHOD FOR CASTING STEEL

(71) Applicants: ThyssenKrupp Steel Europe AG, Duisburg (DE); ThyssenKrupp AG, Essen (DE)

(72) Inventors: Evgeny Balichev, Düsseldorf (DE); Matthias Dresler, Rheinberg (DE); Jenny Rudnizki, Düsseldorf (DE)

(73) Assignees: THYSSENKRUPP STEEL EUROPE AG, Duisburg (DE); THYSSENKRUPP AG, Essen (DE)

( * ) Notice: Subject to any disclaimer, the term of this patent is extended or adjusted under 35 U.S.C. 154(b) by 138 days.

(21) Appl. No.: 15/318,294

(22) PCT Filed: Jun. 18, 2015

(86) PCT No.: PCT/EP2015/063749
§ 371 (c)(1),
(2) Date: Dec. 12, 2016

(87) PCT Pub. No.: WO2015/197470
PCT Pub. Date: Dec. 30, 2015

(65) Prior Publication Data
US 2017/0129005 A1    May 11, 2017

(30) Foreign Application Priority Data
Jun. 24, 2014  (DE) .................. 10 2014 108 843

(51) Int. Cl.
*B22D 11/111* (2006.01)
*B22D 11/108* (2006.01)
(Continued)

(52) U.S. Cl.
CPC .......... *B22D 11/111* (2013.01); *B22D 11/001* (2013.01); *B22D 11/108* (2013.01); *C04B 5/00* (2013.01)

(58) Field of Classification Search
CPC ....... B22C 11/108; B22C 11/111; C21C 7/06; C21C 7/076; C22B 9/10
(Continued)

(56) References Cited

U.S. PATENT DOCUMENTS 4,561,894 A * 12/1985 Fontaine ............... B22D 11/111
75/309
5,356,454 A * 10/1994 Itoyama ................ B22D 11/111
501/125

FOREIGN PATENT DOCUMENTS

CN     101332497 A   12/2008
CN     102233414 A   11/2011
(Continued)

OTHER PUBLICATIONS

Machine translation of CN 101332497 A (Dec. 31, 2008). (Year: 2008).*
(Continued)

*Primary Examiner* — Kevin E Yoon
*Assistant Examiner* — Jacky Yuen
(74) *Attorney, Agent, or Firm* — The Webb Law Firm (57) ABSTRACT

Improved casting powders and improved casting slags enable production of steels having high aluminum contents of greater than or equal to 1% by weight and, in some cases, high manganese content of greater than or equal to 15% by weight. In some examples, such steels may also or alternatively include greater than or equal to 0.2% by weight titanium. The casting slag may result from a casting powder that comprises CaO and $Al_2O_3$ components essentially in the form of prefused calcium aluminate. Methods for casting
(Continued)

steel, including methods for continuously casting steel, are also disclosed based on the use of the disclosed casting powders or casting slags.

13 Claims, 2 Drawing Sheets

(51) Int. Cl.
*C04B 5/00* (2006.01)
*B22D 11/00* (2006.01)

(58) Field of Classification Search
USPC .......................................... 164/473; 75/305
See application file for complete search history.

(56) References Cited

FOREIGN PATENT DOCUMENTS

| CN | 102389955 A | | 3/2012 |
|---|---|---|---|
| CN | 102407306 A | | 4/2012 |
| CN | 102764866 A | | 11/2012 |
| CN | 103128243 A | | 6/2013 |
| CN | 103443298 A | | 12/2013 |
| DE | 101 05 620 A1 | | 9/2002 |
| JP | S57184563 A | | 11/1982 |
| JP | S 6356019 B | | 3/1988 |
| JP | H09-76049 A | | 3/1997 |
| JP | H09-85404 A | | 3/1997 |
| JP | 2000-071051 A | | 3/2000 |
| JP | 2002346708 A | | 12/2002 |
| JP | 2003033849 A | * | 2/2003 |
| JP | 2006-110578 A | | 4/2006 |
| JP | 4554120 B2 | | 7/2010 |
| JP | 2012-125826 A | | 7/2012 |
| WO | 2004/054742 A1 | | 7/2004 |
| WO | 2007/148939 A1 | | 12/2007 |
| WO | 2011/090218 A1 | | 7/2011 |

OTHER PUBLICATIONS

Machine translation of CN 102764866 A (Nov. 7, 2012). (Year: 2012).*
Machine translation of CN 102233414 A (Nov. 9, 2011). (Year: 2011).*
Machine translation of JP H09-85404 A (Mar. 31, 1997). (Year: 1997).*
English translation of International Search Report for International patent application No. PCT/EP2015/063749; dated Sep. 18, 2015.
English language Abstract for JP 2000-071051 A listed above.
English language Abstract for JP H09-85404 A listed above.
English language Abstract for JP 2012-125826 A listed above.
English language Abstract for JP 2006-110578 A listed above.
English language Abstract for JP H09-76049 A listed above.
Deutsche Norm, DIN 51723, "Determinining the fluorine content of solid fuels", 2002, pp. 1-4.
International Standard, ISO 11885, "Water quality—Determination of selected elements by inductively coupled plasma optical emission spectrometry (ICP-OES)", 2007, pp. 1-28.
International Standard, ISO 10304-1, "Walter quality—Determination of dissolved anions by liquid chromatography of ions—Part 1: Determination of Bromide, chloride, fluoride, nitrate, nitrite, phosphate and sulfate", 2007, pp. 1-15.

* cited by examiner

CASTING POWDER, CASTING SLAG AND METHOD FOR CASTING STEEL

CROSS REFERENCE TO RELATED APPLICATIONS

This application is a U.S. National Stage Entry of International Patent Application Serial Number PCT/EP2015/063749, filed Jun. 18, 2015, which claims priority to German Patent Application No. DE 10 2014 108 843.3 filed Jun. 24, 2014, the entire contents of both of which are incorporated herein by reference.

FIELD

The present disclosure generally relates to castings and, more particularly, to casting powders, casting slags, and methods for casting steel.

BACKGROUND

In the casting of steel, casting powder is applied continually to the surface of molten steel which is located in a casting mold. Here, the powder is melted by the heat to form a slag layer, which flows continuously into the gap between the casting mold and the solidified shell of the steel and is therefore consumed. The most important functions of the casting powder and/or the resultant slag are those of lubrication between the casting mold and the solidifying shell, control over the removal of heat from the hardening steel, the accommodation of deoxidation products, the prevention of reoxidation, and the heat insulation of the molten steel.

Typical casting powders for the continuous casting of steels are composed of a calcium silicate basis and customarily include a considerable amount of silicon dioxide ($SiO_2$) and also other easily reducible components such as manganese oxide (MnO) and iron oxide (FeO), for example, and so, during the casting of aluminum-alloyed steels, the aluminum oxide content of the casting slag increases sharply because of a chemical reaction between the aluminum (Al) in the steel and the silicon dioxide and also manganese oxide and iron oxide in the casting slag:

$4Al + 3SiO_2 \leftrightarrow 2Al_2O_3 + 3Si$ $2Al + 3MnO \leftrightarrow Al_2O_3 + 3Mn$ $2Al + 3FeO \leftrightarrow Al_2O_3 + 3Fe.$ The typical takeup of aluminum oxide ($Al_2O_3$, also referred to as alumina) in the casting of Al-killed steels is around 2-4 wt %. With a higher aluminum content in the steel, there is an increase in the $Al_2O_3$ takeup in the casting slag. For example, in the production of TRIP steels with an Al content of around 1.2-1.5 wt %, the $Al_2O_3$ concentration in the casting slag rises to around 35-40 wt %.

The $SiO_2$ content of the casting slag is reduced correspondingly, since silicon dioxide is reduced by aluminum. Generally speaking, this alters the properties of the casting slag.

For example, in view of the takeup of $Al_2O_3$ and the associated decrease in the fraction of $SiO_2$, there are increases in the basicity, the viscosity, and the crystallization propensity of the casting slag, resulting in a deterioration in its lubricating effect. Generally speaking, amorphously solidifying casting slags have better lubricating effects than casting slags which solidify in crystalline form. In the prior art, slag systems based on calcium silicates are customarily used. These calcium silicate-based slag systems typically have solidification which is predominantly amorphous, as long as the aluminum fraction of the steel is not too high, i.e., in particular is <1 wt %. If Al contents in the melt are higher, however, the solidification of calcium silicate-based slag systems is predominantly crystalline.

In the casting of aluminum-alloyed steels which at the same time have a high manganese content (e.g. having Mn contents ≥15 wt % and Al contents ≥1 wt %), an additional complication to the casting process is that the liquidus temperature of these steels is around 100° C. lower than, for example, the liquidus temperature of the TRIP steels, because of the high Mn content. This means that for steels with high Al—Mn content, the melting and crystallization temperature of the casting slag must likewise be situated around 100° C. lower than for other steels of high Al content. Otherwise the casting slag may crystallize completely in the lower half of the casting mold, thereby eliminating its lubricating effect.

Because of the above-described changes in the properties of the casting slag during the casting of an Al-alloyed steel, the slag is frequently no longer able to fulfill its functions adequately or at all. Steels with a high aluminum content or aluminum and manganese content in particular, therefore, cannot be produced in an operationally reliable way with the casting powders known from the prior art.

Known from WO2011/090218 are casting powder compositions for the casting of steel which, however, in view of their high $SiO_2$ content of 15-30 wt %, are unsuitable in particular for use in the casting of steel having a high aluminum content. The same also applies to the casting powders known from WO2007/148939 and their use in the casting of steel. JP 57184563 A discloses a powder for the coating of molten metal having a comparatively low $SiO_2$ content. Because of its chemical composition, however, the slag obtained from this powder is unable to ensure the necessary functional qualities, such as lubricating effect and heat transfer, for example, especially for high Al—Mn steels. From experience, slags resulting from casting powders disclosed in JP 57184563 possess excessively high crystallization temperatures and excessively high viscosities in the operationally relevant range.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

One example object of the present disclosure, therefore, is to provide a casting powder and a casting slag that enable the production of steels having high aluminum contents of ≥1 wt % and, in some examples, high manganese contents of ≥15 wt % and also, in some examples, titanium contents of ≥0.2 wt %. Another example object of the present disclosure is to provide a method for the casting of steel, more particularly a method for the continuous casting of steel, using this casting powder or the casting slag.

In a first aspect, the invention relates to a casting slag comprising the following components:
30-50 wt % CaO;
20-45 wt % $Al_2O_3$;
7-15 wt % $F^-$ (fluorine ions);
5-15 wt % $Na_2O$;
3-6.5 wt % $SiO_2$;
2-5% wt % $Li_2O$.

The casting slag results from a casting powder which comprises the CaO and $Al_2O_3$ components essentially in the form of prefused calcium aluminate. Essentially prefused means, in the sense of the present invention, that the calcium aluminate is >50%, preferably >60%, more preferably >70%, very preferably >80%, most preferably >90% up to 100% prefused.

Furthermore, the casting powder comprises a fluoride-containing component, preferably $CaF_2$, $SiO_2$, optionally also in the form of $CaSiO_3$, $Na_2O$, optionally also in the form of $Na_2CO_3$, $Li_2O$, optionally also in the form of $Li_2CO_3$, and optionally additionally $Al_2O_3$.

This casting powder may also include volatile constituents which are, for example, outgassed on heating, such as water or $CO_2$, for example.

In a further aspect, therefore, the present invention relates to a casting powder comprising the following components, calculated without volatile constituents:
40-60 wt % prefused calcium aluminate;
10-30 wt % fluoride-containing component, preferably $CaF_2$;
3-6.5 wt % $SiO_2$;
5-15 wt % $Na_2O$;
2-5.5 wt % $Li_2O$;
≤10.5 wt % $Al_2O_3$;
≤15 wt % carbon.

Important for achieving the desired casting slag composition and obtaining the requisite casting slag properties, such as its viscosity, for example, is that the ratio of CaO to $Al_2O_3$ in the prefused calcium aluminate is in the range from around 40/60 (2:3) to around 50/50 (1:1). The ratio of CaO to $Al_2O_3$ in the prefused calcium aluminate ought not to be significantly less than 0.6 or significantly more than 1.0, since otherwise the liquidus temperature of the calcium aluminate will be too high, the calcium aluminate as a constituent of the casting powder will melt, and therefore the casting powder will not melt sufficiently. The ratio is preferably 0.6 to 1.1, more preferably 0.65 to 1.05, very preferably 0.7 to 1 or 0.7 to 0.9.

It is important, furthermore, that the calcium aluminate is in prefused form in the casting powder. The preferred compositions of the calcium aluminate are virtually eutectic compositions, which result in quicker melting of the casting powder and also in a lower crystallization propensity on the part of the casting slags obtained from this casting powder, thereby raising operational reliability. Another reason to the use of prefused calcium aluminate lies in the easier handling of the CaO addition. The use of burnt lime (CaO) makes it more difficult to produce a casting powder because the burnt lime is highly hygroscopic and may alter its weight by taking up moisture. This may lead to a shift in the $CaO/Al_2O_3$ ratio in the casting powder or casting slag composition, and may impair its properties.

Silicon makes a contribution to stabilizing the amorphous state, and promotes the amorphous solidification of the casting slag. The $SiO_2$ fraction in the casting powder ought not to be less than 3 wt %, since otherwise the amorphous fraction of the resulting casting slag is less than 60%. The $SiO_2$ fraction in the casting powder ought not to be more than 6.5 wt %, since otherwise the additional fraction of $SiO_2$ would react with the aluminum present in the steel melt. The free oxygen would bind to aluminum, and so the slag would additionally make up $Al_2O_3$. The slag system would no longer be chemically stable, meaning that the target optimum ratio of CaO to $Al_2O_3$ would no longer be the case.

The fluoride-containing components, $Na_2O$ and $Li_2O$ in the casting powder influence the solidification temperature and also the crystallization behavior of the resultant casting slag. The fraction of a fluoride-containing component ought not to be less than 10 wt %, the fraction of $Na_2O$ not less than 5 wt %, and the fraction of $Li_2O$ not less than 2 wt %, since otherwise the solidification temperature would rise and the fraction of slag solidifying in crystalline form would increase. The influence of $Li_2O$ in this context is greater than that of $Na_2O$, which is why $Li_2O$ must be admixed only in small quantities. In comparison to $Na_2O$, however, $Li_2O$ is very expensive, and so for reasons of cost the effect of $Li_2O$ is compensated as far as possible with $Na_2O$.

The fraction of a fluoride-containing component ought not to be more than 30 wt %, the fraction of $Na_2O$ not more than 15 wt %, and the fraction of $Li_2O$ not more than 5.5 wt %, since otherwise the solidification temperature would be too low and the casting slag would be too low in viscosity. Low-viscosity casting slag runs off from the steel surface, meaning that the lubricating effect of the slag is no longer provided over the whole of the contact area between steel strand shell and mold wall. This can lead to the rupture of the strand shell, which is still thin, and to production losses as a result of strand ruptures. Furthermore, an incompletely formed slag film leads to uneven heat removal conditions, which result in turn in thermal stresses within the strand shell and hence possibly likewise to strand ruptures.

$Al_2O_3$ can be added to the casting powder additionally to the $Al_2O_3$ bound within the prefused calcium aluminate. The additional $Al_2O_3$ is added to the casting powder in order to keep the ratio of CaO to $Al_2O_3$ within the target optimum range of around 0.6 to around 1.0 when levels of calcium-containing components, particularly of $CaF_2$, are relatively high, since additions of calcium-containing components, particularly of $CaF_2$, shift the initial ratio of CaO to $Al_2O_3$ that is introduced by way of the calcium aluminate. The fraction of additional $Al_2O_3$ ought not to exceed 10.5 wt %, so as not to shift the ratio of CaO to $Al_2O_3$ too strongly in favor of $Al_2O_3$, which in turn would have adverse consequences for the formation and the functionality of the casting slag. On addition of additional $Al_2O_3$, a ratio of CaO to $Al_2O_3$ of 0.7 to 0.9 in the casting powder has proven particularly advantageous.

Carbon can be added to the casting powder in order to accelerate the melting of the casting powder. The carbon content of the casting powder ought not to be more than 15 wt %, in order to prevent carbonization of the steel melt. The carbon may be present preferably in an amount of 4-10 wt %, more preferably 5-7 wt %, in the casting powder. This carbon may be used in a customary form known to the skilled person, such as in the form of carbon black, graphite or coke dust, for example.

The skilled person understands that the casting powder of the invention need not be strictly in powder form, but instead at least in part, or even completely, may also be present in another form, such as in the form of granules or in the form of hollow beads, and optionally even in liquid form, for example.

On solidification, the casting slag of the invention is to have a substantially amorphous structure, i.e., the amorphous fraction in the casting slag is to be at least 60%, preferably at least 70%, more preferably at least 80%. Especially good properties are possessed by slags having an amorphous fraction of at least 90%. The high amorphous fraction is important in order to maintain good lubricating properties and a uniform heat conduction.

The casting slag of the invention has advantages in particular in the production of steels having Al contents ≥1 wt %, since these casting slags are chemically stable even with steels having Al contents ≥1 wt %. Chemically stable means that the slag in the course of casting does not react with the aluminum dissolved in the steel melt, and its chemical composition remains virtually unchanged. This enhances the operational reliability and product quality.

With steels which additionally have a high manganese content of ≥15 wt %, for example, high operational reliability can also be achieved using the casting slag of the invention. Steels having Mn contents ≥15 wt % have a much lower liquidus temperature than steels with lower Mn contents. Typical liquidus temperatures for steels with Mn contents ≥15 wt % are 1400-1430° C.

Steels having an Al content ≥1 wt % and additional high titanium content of ≥0.2 wt %, for example, exhibit the difficulty in operation that not only Al as a chemically active element but also Ti as a chemically active element are present in relatively high proportions. Casting slags which are used for producing such steels must exhibit good chemical stability with respect to Al and Ti. This is the case with the casting slags of the invention.

Titanium is a chemically active element and is able to leach Si or Mn from the slag by binding to itself the oxygen that is bound to Si or Mn. Where titanium dioxide content is high, titanium calcium oxide compounds ($TiO_2$—CaO) may form, promoting crystalline solidification of the casting slag. In order to prevent this problem, it is advantageous not to add such constituents, such as manganese oxide and iron oxide, for example, to the casting powders of the invention. These components are therefore not deliberately added, but may be present as unwanted accompanying elements in the casting powder of the invention and hence in the casting slag of the invention.

The casting slag composition of the invention may comprise further alkali metal oxides, alkaline earth metal oxides, or transition metal oxides. The casting slag composition of the invention may therefore comprise one or more of the following components:
≤5.0 wt % $TiO_2$;
≤5.0 wt % MgO;
≤3.0 wt % MnO;
≤2.0 wt % FeO.

The associated preferred casting powder composition therefore further comprises one or more of the following components:
≤5.0 wt % $TiO_2$;
≤5.0 wt % MgO;
≤3.0 wt % MnO;
≤1.0 wt % $Fe_2O_3$;
≤1.0 wt % FeO.

$TiO_2$ may be added to the casting powder of the invention. However, the fraction of $TiO_2$ in the casting powder ought not to be more than 5.0 wt %, since the fraction of $TiO_2$ above this figure would react with the aluminum present in the steel melt. The free oxygen would bind to aluminum, causing the slag additionally to take up $Al_2O_3$. The slag system would no longer be chemically stable, i.e., the target optimum ratio of CaO to $Al_2O_3$ would no longer be the case. Furthermore, at $TiO_2$ fractions of >5 wt %, titanium in elemental form could transfer into the steel melt and undesirably alter its chemical composition.

MgO, MnO, $Fe_2O_3$, and FeO may be present as accompanying elements in the casting powder, but are not deliberately added in order to adjust the casting slag properties.

In one preferred embodiment, the casting slag of the invention comprises the following components:
33-48 wt % CaO;
23-43 wt % $Al_2O_3$;
7-13 wt % $F^-$ (fluorine ions);
3-6.5 wt % $SiO_2$;
7-12 wt % $Na_2O$;
2-5 wt % $Li_2O$;
≤3 wt % $TiO_2$;
≤1.5 wt % MgO;
≤1.0 wt % MnO;
≤1 wt % FeO.

The associated preferred casting powder composition comprises the following components, calculated without volatile constituents:
40-60 wt % prefused calcium aluminate;
15-30 wt % fluoride-containing component, preferably $CaF_2$;
3-6 wt % $SiO_2$;
7-12 wt % $Na_2O$;
2-5.5 wt % $Li_2O$;
≤10.5 wt % $Al_2O_3$;
≤15 wt % carbon;
≤3.0 wt % $TiO_2$;
≤1.0 wt % MgO;
≤1.0 wt % MnO;
≤1.0 wt % $Fe_2O_3$;
≤1.0 wt % FeO.

The weight figures stated for the abovementioned compositions of the casting slags and casting powders are based in each case on the sum total of the components of the casting slag composition or casting powder compositions, respectively.

The fluorine ions and fluoride-containing components in the casting slags and casting powder compositions of the invention may be added in each case in the form of customary fluorides, examples being fluorides of the alkali metals, alkaline earth metals and/or transition metals, more particularly in the form of a fluoride selected from the group consisting of $CaF_2$, $MgF_2$, NaF, LiF, and mixtures of two or more of these fluorides.

In embodiments of the casting slags and casting powders of the invention that are particularly preferred in each case, the fraction of the fluorine ions and/or fluoride-containing component comes from $CaF_2$ (also referred to as fluorspar).

The composition of a casting powder comprising the components calcium aluminate (CaO—Al$_2$O$_3$) and CaF$_2$ has emerged as being particularly advantageous for improving the consistency of properties of the resultant casting slag and hence in particular the operational reliability of the production of Al-alloyed steels as well. The components of this ternary CaO—Al$_2$O$_3$—CaF$_2$ mixture do not enter into any reaction with the aluminum present in the steel, and so the chemical stability of the casting powder is ensured, as are consistent properties of the resultant casting slag, during casting.

The precise composition of the casting powder employed may vary and so may be adapted further to the prevailing conditions, such as to the composition of the steel or to the type of casting process, for example.

The possibility also exists in principle of using boron trioxide (B$_2$O$_3$) as a casting powder additive. The boron trioxide present in the powder or in the slag can be reduced by the aluminum present in the steel, in accordance with the following reaction equation:

$$2Al + B_2O_3 \leftrightarrow Al_2O_3 + 2B$$

The reduced boron may be entrained into the melt as an unwanted accompanying element. In order to prevent this, boron is preferably omitted from the casting powder and casting slag compositions described herein.

In order to optimize the functional properties, such as lubricating properties in the casting gap between steel and mold, for example, the composition of the casting slags may be adapted to the liquidus temperature of the grade of steel to be cast. This is done, for example, by setting defined contents of fluxes in the casting powder, such as sodium oxide (Na$_2$O) and/or lithium oxide (Li$_2$O) and/or the amount of fluoride-containing components.

In the casting of steel grades with a high liquidus temperature of, e.g., 1500-1530° C., for example, an Na$_2$O content of 5-11 wt %, an Li$_2$O content of around 2-3 wt %, and an F$^-$ content of 8-10.5 wt % may be set in the casting slag, with the sum total of Na$_2$O, Li$_2$O, and F$^-$ being preferably <25 wt %. The sum total of Na$_2$O, Li$_2$O, and F$^-$ ought to be <25 wt % in order to prevent the viscosity of the slag becoming too low.

In a further aspect, therefore, the present invention relates to a casting slag composition for steels having a high liquidus temperature, which comprises the following components:
30-50 wt % CaO;
20-45 wt % Al$_2$O$_3$;
8-10.5 wt % F$^-$ (fluorine ions);
3-6.5 wt % SiO$_2$;
5-11 wt % Na$_2$O;
2-3 wt % Li$_2$O;
≤3 wt % TiO$_2$;
≤5 wt % MgO;
≤3 wt % MnO;
≤2 wt % FeO.

The associated casting powder composition comprises, calculated without volatile constituents:
40-60 wt % prefused calcium aluminate;
10-30 wt % fluoride-containing component, preferably in the form of CaF$_2$;
3-6.5 wt % SiO$_2$;
5-11 wt % Na$_2$O;
2-3 wt % Li$_2$O;
≤10.5 wt % Al$_2$O$_3$;
≤15 wt % carbon;
≤3.0 wt % TiO$_2$;
≤5.0 wt % MgO;
≤3.0 wt % MnO;
≤1.0 wt % Fe$_2$O$_3$;
≤1.0 wt % FeO.

In one preferred embodiment, the casting slag composition for steels having a high liquidus temperature comprises the following components:
33-48 wt % CaO;
23-43 wt % Al$_2$O$_3$;
8-10.5 wt % F$^-$ (fluorine ions);
3-5 wt % SiO$_2$;
5-11 wt % Na$_2$O;
2-3 wt % Li$_2$O;
≤3 wt % TiO$_2$;
≤1.5 wt % MgO;
≤1.0 wt % MnO;
≤1.0 wt % FeO.

The associated preferred casting powder composition comprises the following, calculated without volatile constituents:
40-60 wt % prefused calcium aluminate;
10-25 wt % fluoride-containing component, preferably in the form of CaF$_2$;
3-5 wt % SiO$_2$;
5-11 wt % Na$_2$O;
2-3 wt % Li$_2$O;
≤8 wt % Al$_2$O$_3$;
≤5 wt % carbon;
≤3.0 wt % TiO$_2$;
≤1.0 wt % MgO;
≤1.0 wt % MnO;
≤1.0 wt % Fe$_2$O$_3$;
≤1.0 wt % FeO.

Figure 1:
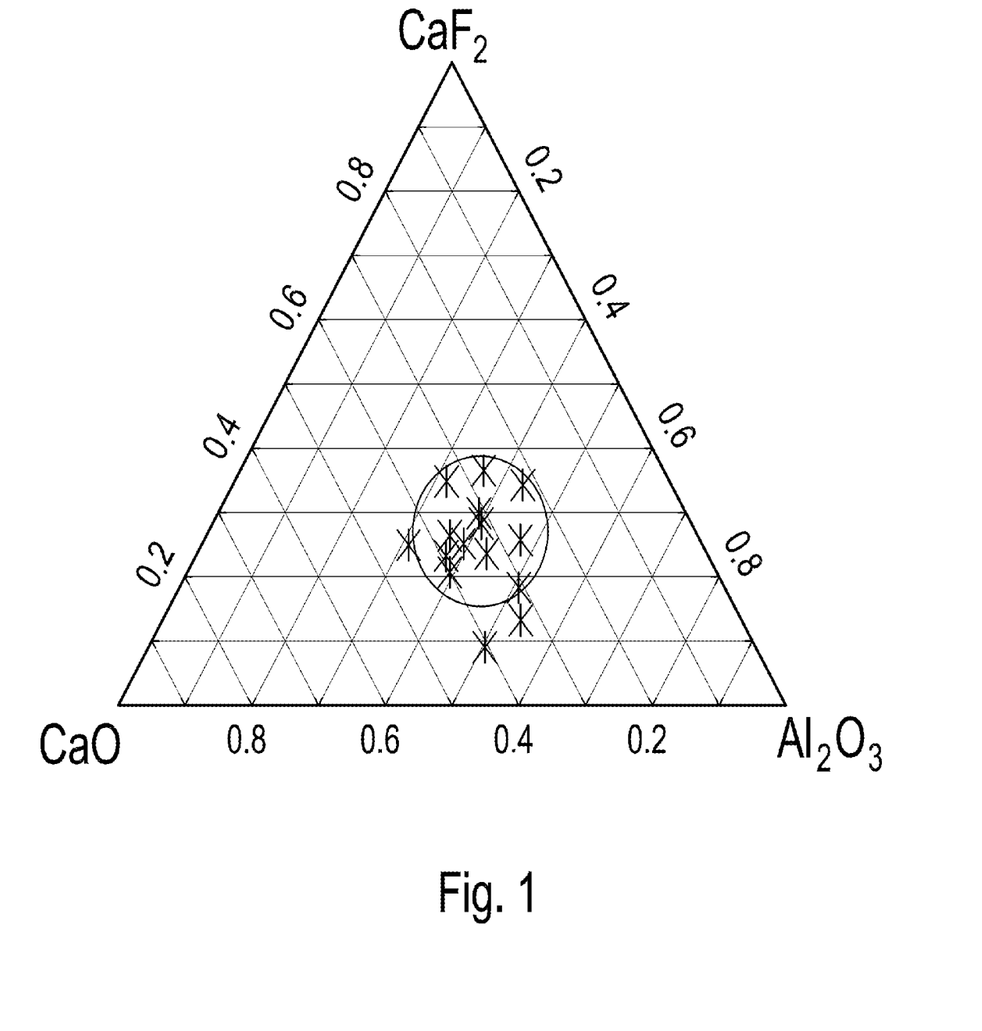
FIG. 1 shows advantageous compositions of the components CaO, $Al_2O_3$, and $CaF_2$.
Figure 2:
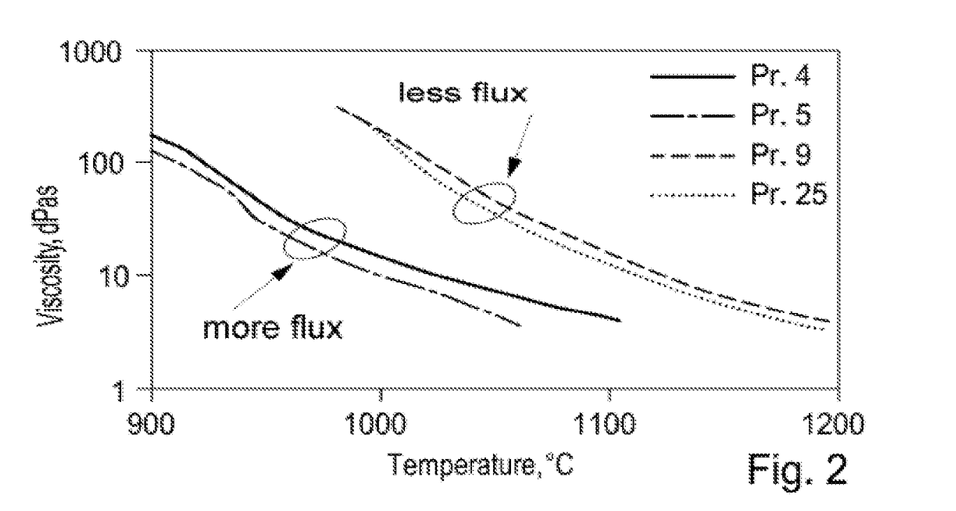
FIG. 2 is a chart showing viscosity of a number of casting slags as a function of temperature, measured using a high-temperature rotary viscometer from Bähr, for different flux contents.

For steels with a low liquidus temperature, e.g., 1400-1430° C., a casting slag contemplated in particular is one having an Na$_2$O content of 9-15 wt %, an Li$_2$O content of 4-5 wt %, and an F$^-$ content of 12.5-15 wt %, with the sum total of Na$_2$O, Li$_2$O, and F$^-$ being ≥25 wt %. Here, for the cases with relatively high flux contents, the measured viscosity is shifted by around 100° C. to the lower temperatures (FIG. 2).

In a further aspect, therefore, the present invention relates to a casting slag composition for steels having a low liquidus temperature that comprises the following components:
30-50 wt % CaO;
20-45 wt % Al$_2$O$_3$;
12.5-15 wt % F$^-$ (fluorine ions);
3-6.5 wt % SiO$_2$;
9-15 wt % Na$_2$O;
4-5 wt % Li$_2$O;
≤3 wt % TiO$_2$;
≤5 wt % MgO;
≤3 wt % MnO;
≤2 wt % FeO.

The associated casting powder has a composition which, calculated without volatile constituents, comprises the following components:
40-60 wt % prefused calcium aluminate;
15-30 wt % fluoride-containing component, preferably in the form of CaF$_2$;
3-6.5 wt % SiO$_2$;
9-15 wt % Na$_2$O;
3-5 wt % Li$_2$O;
≤10 wt % Al$_2$O$_3$;
≤15 wt % carbon;
≤3 wt % TiO$_2$;
≤5 wt % MgO;

≤3 wt % MnO;
≤1 wt % Fe$_2$O$_3$;
≤1 wt % FeO.

In one preferred embodiment, the casting slag composition of the invention for steels having a low liquidus temperature comprises the following components:
33-48 wt % CaO;
23-43 wt % Al$_2$O$_3$;
12.5-15 wt % F$^-$ (fluorine ions);
3-5 wt % SiO$_2$;
11-15 wt % Na$_2$O;
3-5 wt % Li$_2$O;
≤3 wt % TiO$_2$;
≤1.5 wt % MgO;
≤1 wt % MnO;
≤1 wt % FeO.

The associated preferred casting powder composition, calculated without volatile components, comprises:
40-60 wt % prefused calcium aluminate;
15-30 wt % fluoride-containing component, preferably in the form of CaF$_2$;
3-5 wt % SiO$_2$;
11-15 wt % Na$_2$O;
3-5 wt % Li$_2$O;
≤10 wt % Al$_2$O$_3$;
≤15 wt % carbon;
≤3.0 wt % TiO$_2$;
≤1.5 wt % MgO;
≤1.0 wt % MnO;
≤1.0 wt % Fe$_2$O$_3$;
≤1.0 wt % FeO.

Another important property of the casting slags is their thermal conductivity. Within the casting gap, this conductivity determines the transfer of heat from the steel to the mold. The thermal conductivity is influenced principally by the crystallization behavior of the casting slags. Here it is important whether the casting slag undergoes amorphous or crystalline solidification. Typical casting slags based on calcium silicate have predominantly amorphous solidification, or form amorphous and crystalline constituents when cooled rapidly. The amorphous fraction of the casting slags is advantageous for the lubricating properties and ensures greater heat transfer.

In the casting of steels exhibiting peritectic solidification, a lower heat transfer is desirable in order to prevent longitudinal cracks. This lower heat transfer can be achieved by methods including the use of casting slags having a relatively high crystalline fraction, if the amorphous/crystalline ratio and the associated thermal conductivity of the casting slags is adapted to the grade of steel. Adaptation is possible in turn through the amount of the fluxes (Na$_2$O, Li$_2$O, F$^-$). The higher fraction of the fluxes leads at the same time to higher amorphous fractions in the casting slag.

The addition of not more than 6.5 wt % SiO$_2$ prevents an excessive amorphous fraction in the casting slag.

In preferred embodiments of the present invention, therefore, in the compositions identified above, the amount of SiO$_2$ component is ≤6 wt %, preferably ≤5.5 wt %, more preferably ≤5 wt %.

Figure 3:
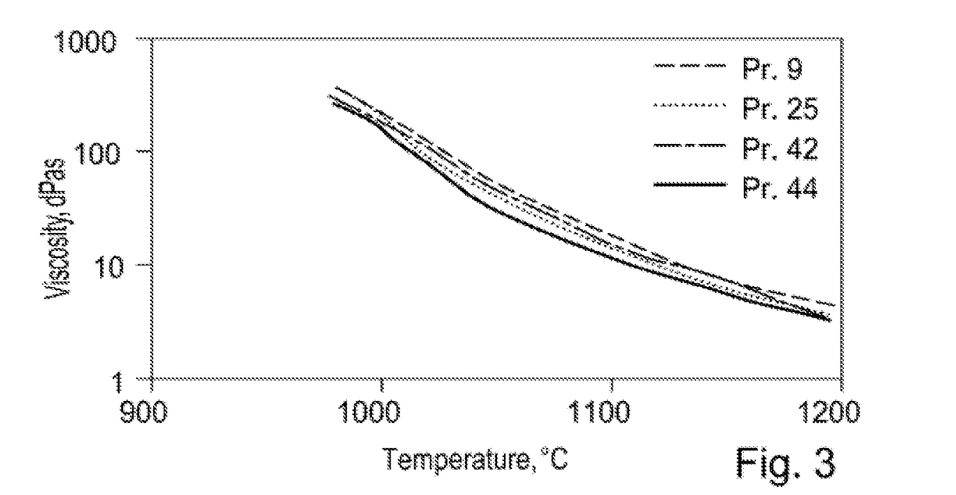
FIG. 3 is a chart showing viscosity of a number of casting slags on reduction of a $SiO_2$ fraction and increase of the $TiO_2$ fraction (Pr.9 and Pr.25 with around 5 wt % $SiO_2$; Pr.42 and Pr.44 with around 4 wt % $SiO_2$ and around 2 wt % $TiO_2$).

Supplying a relatively low TiO$_2$ content permits a further reduction in the SiO$_2$ content of the casting powder compositions identified above. TiO$_2$ likewise benefits the formation of the amorphous fraction of the casting slags and, moreover, is more thermodynamically stable than SiO$_2$ with respect to reaction with the Al present in the steel. The viscosity of the casting slags remains unchanged on reduction of SiO$_2$ and simultaneous addition of TiO$_2$ (FIG. 3).

In a further aspect, therefore, the present invention relates to a casting slag composition which has the following components:
30-50 wt % CaO;
20-45 wt % Al$_2$O$_3$;
8-15 wt % F$^-$ (fluorine ions);
3-5 wt % SiO$_2$;
5-15 wt % Na$_2$O;
2-5 wt % Li$_2$O;
1.5-5 wt % TiO$_2$;
≤5 wt % MgO;
≤3 wt % MnO;
≤2 wt % FeO.

The associated casting powder has a composition which, calculated without volatile constituents, comprises the following components:
40-60 wt % prefused calcium aluminate;
10-30 wt % fluoride-containing component, preferably in the form of CaF$_2$;
3-5 wt % SiO$_2$;
5-15 wt % Na$_2$O;
2-5 wt % Li$_2$O;
≤10 wt % Al$_2$O$_3$;
≤15 wt % carbon;
1.5-5 wt % TiO$_2$;
≤5 wt % MgO;
≤3 wt % MnO;
≤1 wt % Fe$_2$O$_3$;
≤1 wt % FeO.

In one preferred embodiment, the casting slag composition of the invention comprises the following components:
33-48 wt % CaO;
23-43 wt % Al$_2$O$_3$;
8-13 wt % F$^-$ (fluorine ions);
3-4 wt % SiO$_2$;
8-13 wt % Na$_2$O;
3-5 wt % Li$_2$O;
1.5-3 wt % TiO$_2$;
≤1.5 wt % MgO;
≤1 wt % MnO;
≤1 wt % FeO.

The associated preferred casting powder has a composition which, calculated without volatile constituents, comprises the following components:
50-60 wt % prefused calcium aluminate;
15-25 wt % fluoride-containing component, preferably in the form of CaF$_2$;
3-4 wt % SiO$_2$;
8-13 wt % Na$_2$O;
3-5 wt % Li$_2$O;
≤10 wt % Al$_2$O$_3$;
≤15 wt % carbon;
1.5-3 wt % TiO$_2$;
≤1.5 wt % MgO;
≤1.0 wt % MnO;
≤1 wt % Fe$_2$O$_3$;
≤1 wt % FeO.

A particular feature of the casting slags of the invention is that they have no or only very low reactivity toward an aluminum fraction in steels, thereby extending the spectrum of castable steel grades and allowing reliable production even of steels having a high fraction of aluminum or a high fraction of aluminum and manganese. This also results ultimately in an improvement in the quality of the steel products obtained using these casting powders.

A further aspect of the present invention relates to a method for the casting of steel using a casting powder as described above.

All preferred embodiments described above in connection with the casting powder of the invention are also valid correspondingly for the method of the invention for the casting of steel, and are therefore not repeated at this point.

The method for the casting of steel takes place preferably by continuous operation, more particularly in accordance with a continuous casting method.

In one preferred embodiment, the present invention relates to a method of the invention for the casting of steel having an aluminum content of ≥1 wt %, preferably of ≥1.5 wt %, more preferably ≥3.0 wt %, very preferably ≥5.0 wt %.

In a further preferred embodiment, the present invention relates to a method of the invention for the casting of steel having a manganese content of ≥15 wt %, preferably ≥17.5 wt %, more preferably ≥20 wt %.

In another preferred embodiment, the present invention relates to a method of the invention for the casting of steel having a titanium content of ≥0.2 wt %, preferably ≥0.5 wt %.

In one preferred embodiment, the present invention relates to a method of the invention for the casting of steel having an aluminum content of ≥1 wt %, preferably of ≥1.5 wt %, more preferably ≥3.0 wt %, very preferably ≥5.0 wt % and optionally a manganese content of ≥15 wt %, preferably ≥17.5 wt %, more preferably ≥20 wt %, and optionally a titanium content of ≥0.2 wt %, preferably ≥0.5 wt %.

The invention is elucidated below with examples. The elucidations are given merely by way of example and do not restrict the general concept of the invention.

Example

Various casting powders with the compositions indicated in table 1 were investigated. The C-containing samples Pr. 5, 19, 32, 40, and 44 were precalcined at 600° C. for 8 hours and melted at 1500° C. under an argon atmosphere. The C-free samples were not precalcined, being instead melted directly at 1500° C. under an argon atmosphere. After having been melted, the samples were each held at 1500° C. for 15 minutes and were subsequently cast onto a steel substrate, which was at room temperature, at room temperature in air for cooling. The cooled samples had thicknesses of up to 15 mm, which varied over the sample surface. For the subsequent investigations, locations were selected at which the solidified slag layer was 5 to 7 mm thick. At these locations, the fraction with amorphous and/or crystalline solidification in the sample cross section was determined with the aid of a light microscope.

Table 2 indicates the chemical compositions and also the amorphous fraction of the resulting slags. The chemical composition of the casting powders and of the casting slags was determined in triplicate in each case on samples by means of an X-ray fluorescence method. The content of fluorine ions was determined by hydropyrolysis to DIN 51723 and DIN 51727, with subsequent ion chromatography to DIN EN ISO 10304. The $Na_2O$ concentration was determined after appropriate sample preparation, by means of an ICPOS measurement to DIN EN ISO 11885.

Furthermore, casting powder samples with the composition of samples 31, 40, and 48 were brought into contact with selected melts and held under an argon atmosphere at 1450° C.-1550° C. for 15 minutes (cf. table 3). Slag and melt were then cast separately and each analyzed. The associated liquidus temperatures were determined by means of differential thermal analysis (DTA). The casting slag compositions which came about, and the fraction of amorphous casting slag, are identical with the results for samples 31, 40, and 48 in table 2. It was therefore demonstrated that the casting slag systems analyzed previously are also representative on contact with steel melts.

The casting powder compositions of the invention as specified in table 1 are therefore outstandingly suitable for the production of the desired casting slags.

TABLE 1

Composition of the casting powders in wt %, excluding volatile constituents, and ratio of CaO to $Al_2O_3$ in the prefused calcium aluminate (dimensionless)

| Sample | Prefused calcium aluminate | $CaF_2$ | $Na_2O$ | $Li_2O$ | $Al_2O_3$ | $SiO_2$ | $TiO_2$ | C | $CaO/Al_2O_3$ in prefused calcium aluminate |
|---|---|---|---|---|---|---|---|---|---|
| Pr. 4  | 47.3 | 28.7 | 10.6 | 5.0 | 2.6  | 5.6 | 0.0 | 0.0 | 0.80 |
| Pr. 5  | 41.1 | 29.2 | 10.8 | 5.1 | 0.0  | 5.7 | 0.0 | 8.0 | 1.00 |
| Pr. 9  | 42.1 | 29.1 | 10.8 | 2.5 | 9.7  | 5.7 | 0.0 | 0.0 | 0.90 |
| Pr. 10 | 45.6 | 23.5 | 10.3 | 4.9 | 10.2 | 5.5 | 0.0 | 0.0 | 0.90 |
| Pr. 17 | 57.6 | 21.2 | 10.6 | 2.5 | 2.6  | 5.6 | 0.0 | 0.0 | 1.00 |
| Pr. 18 | 51.1 | 21.2 | 10.6 | 2.5 | 9.0  | 5.6 | 0.0 | 0.0 | 0.90 |
| Pr. 19 | 47.1 | 19.8 | 9.9  | 2.3 | 9.1  | 5.2 | 0.0 | 6.7 | 0.80 |
| Pr. 23 | 55.9 | 25.7 | 10.7 | 2.5 | 0.0  | 5.2 | 0.0 | 0.0 | 0.67 |
| Pr. 25 | 57.1 | 21.4 | 10.7 | 2.5 | 3.1  | 5.1 | 0.0 | 0.0 | 1.00 |
| Pr. 26 | 64.3 | 11.2 | 11.7 | 2.7 | 10.0 | 0.0 | 0.0 | 0.0 | 0.90 |
| Pr. 28 | 55.9 | 20.9 | 10.4 | 4.7 | 3.1  | 5.0 | 0.0 | 0.0 | 1.00 |
| Pr. 31 | 56.8 | 21.0 | 10.5 | 3.5 | 2.8  | 5.4 | 0.0 | 0.0 | 1.00 |
| Pr. 32 | 50.9 | 19.8 | 9.9  | 3.3 | 5.0  | 5.0 | 0.0 | 6.1 | 1.00 |
| Pr. 33 | 56.1 | 20.8 | 10.4 | 4.7 | 2.7  | 5.3 | 0.0 | 0.0 | 1.00 |
| Pr. 34 | 55.5 | 22.2 | 10.5 | 3.5 | 2.8  | 5.4 | 0.0 | 0.0 | 1.00 |
| Pr. 35 | 54.1 | 21.7 | 10.2 | 3.5 | 5.2  | 5.2 | 0.0 | 0.0 | 1.00 |
| Pr. 36 | 50.4 | 21.0 | 10.5 | 3.5 | 9.1  | 5.4 | 0.0 | 0.0 | 0.90 |
| Pr. 39 | 53.5 | 20.8 | 10.4 | 4.7 | 5.3  | 5.3 | 0.0 | 0.0 | 1.00 |
| Pr. 40 | 50.3 | 20.1 | 9.5  | 3.2 | 4.9  | 4.9 | 0.0 | 7.1 | 1.00 |
| Pr. 41 | 51.0 | 20.8 | 10.4 | 4.7 | 7.9  | 5.3 | 0.0 | 0.0 | 1.00 |
| Pr. 42 | 57.1 | 21.4 | 10.7 | 2.5 | 3.1  | 3.3 | 1.8 | 0.0 | 1.00 |
| Pr. 43 | 55.7 | 20.9 | 10.4 | 5.0 | 3.1  | 3.3 | 1.7 | 0.0 | 1.00 |

TABLE 1-continued

Composition of the casting powders in wt %, excluding volatile constituents, and ratio of CaO to Al$_2$O$_3$ in the prefused calcium aluminate (dimensionless)

| Sample | Prefused calcium aluminate | CaF$_2$ | Na$_2$O | Li$_2$O | Al$_2$O$_3$ | SiO$_2$ | TiO$_2$ | C | CaO/Al$_2$O$_3$ in prefused calcium aluminate |
|---|---|---|---|---|---|---|---|---|---|
| Pr. 44 | 50.2 | 19.5 | 9.7 | 4.7 | 5.0 | 3.3 | 1.6 | 6.0 | 1.00 |
| Pr. 49 | 56.8 | 21.3 | 10.6 | 3.6 | 3.1 | 3.3 | 1.3 | 0.0 | 1.00 |
| Pr. 50 | 53.7 | 20.9 | 10.4 | 3.5 | 5.3 | 3.6 | 2.6 | 0.0 | 1.00 |
| Pr. 51 | 58.3 | 9.0 | 10.5 | 2.4 | 9.2 | 5.6 | 0.0 | 5.0 | 0.80 |
| Pr. 52 | 59.7 | 7.5 | 10.8 | 2.5 | 9.7 | 5.7 | 0.0 | 4.0 | 0.80 |
| Pr. 53 | 51.1 | 31.0 | 10.4 | 2.4 | 0.0 | 5.0 | 0.0 | 0.0 | 1.00 |

TABLE 2

Composition of the laboratory slags in wt % (standardized) and fraction with amorphous solidification

| Sample | CaO | Al$_2$O$_3$ | SiO$_2$ | F$^-$ | Na$_2$O | Li$_2$O | MgO | FeO | MnO | TiO$_2$ | Amorphous fraction, % |
|---|---|---|---|---|---|---|---|---|---|---|---|
| Pr. 4 | 38.98 | 26.37 | 5.64 | 12.87 | 10.30 | 4.81 | 0.68 | 0.30 | 0.02 | 0.03 | 85 |
| Pr. 5 | 43.00 | 23.58 | 5.76 | 12.47 | 9.18 | 4.83 | 0.74 | 0.39 | 0.02 | 0.04 | 85 |
| Pr. 9 | 39.19 | 30.27 | 5.36 | 10.44 | 10.84 | 2.52 | 0.72 | 0.21 | 0.02 | 0.03 | 90 |
| Pr. 10 | 34.78 | 31.21 | 5.44 | 12.20 | 11.12 | 4.54 | 0.52 | 0.15 | 0.01 | 0.03 | 90 |
| Pr. 17 | 42.43 | 27.41 | 6.27 | 9.91 | 10.21 | 2.73 | 0.69 | 0.29 | 0.02 | 0.04 | 85 |
| Pr. 18 | 38.50 | 33.03 | 5.68 | 8.72 | 10.68 | 2.44 | 0.64 | 0.24 | 0.02 | 0.04 | 60 |
| Pr. 19 | 35.14 | 35.73 | 5.66 | 9.55 | 10.59 | 2.47 | 0.56 | 0.24 | 0.01 | 0.03 | 60 |
| Pr. 23 | 40.54 | 29.75 | 5.29 | 11.25 | 9.99 | 2.29 | 0.63 | 0.22 | 0.01 | 0.03 | 70 |
| Pr. 25 | 43.63 | 29.32 | 5.39 | 8.92 | 9.25 | 2.34 | 0.79 | 0.30 | 0.02 | 0.04 | 90 |
| Pr. 26 | 40.82 | 42.80 | 0.70 | 3.89 | 7.81 | 2.75 | 0.84 | 0.33 | 0.01 | 0.05 | 45 |
| Pr. 28 | 42.91 | 29.45 | 5.19 | 8.51 | 8.23 | 4.65 | 0.73 | 0.27 | 0.01 | 0.04 | 95 |
| Pr. 31 | 42.36 | 28.47 | 5.95 | 8.89 | 9.36 | 3.35 | 0.72 | 0.83 | 0.02 | 0.06 | 80 |
| Pr. 32 | 41.37 | 29.53 | 5.70 | 9.25 | 9.49 | 3.62 | 0.67 | 0.30 | 0.02 | 0.05 | 70 |
| Pr. 33 | 42.36 | 28.40 | 5.76 | 9.16 | 9.04 | 4.23 | 0.68 | 0.29 | 0.02 | 0.07 | 85 |
| Pr. 34 | 42.78 | 27.74 | 5.72 | 9.97 | 9.44 | 3.34 | 0.66 | 0.28 | 0.02 | 0.05 | 70 |
| Pr. 35 | 41.66 | 29.27 | 5.55 | 9.73 | 9.56 | 3.22 | 0.66 | 0.25 | 0.03 | 0.06 | 70 |
| Pr. 36 | 38.33 | 32.55 | 5.61 | 8.89 | 10.50 | 3.24 | 0.58 | 0.23 | 0.02 | 0.06 | 65 |
| Pr. 39 | 41.84 | 29.79 | 5.70 | 7.93 | 9.31 | 4.41 | 0.65 | 0.26 | 0.02 | 0.08 | 95 |
| Pr. 40 | 42.02 | 29.17 | 5.46 | 9.78 | 9.31 | 3.26 | 0.66 | 0.25 | 0.03 | 0.07 | 85 |
| Pr. 41 | 40.12 | 30.45 | 5.52 | 9.04 | 9.47 | 4.45 | 0.63 | 0.23 | 0.02 | 0.07 | 95 |
| Pr. 42 | 42.75 | 29.12 | 3.85 | 9.50 | 9.54 | 2.43 | 0.78 | 0.30 | 0.01 | 1.71 | 70 |
| Pr. 43 | 42.76 | 29.17 | 3.72 | 8.73 | 7.98 | 4.73 | 0.88 | 0.31 | 0.01 | 1.71 | 80 |
| Pr. 44 | 41.30 | 29.68 | 3.94 | 8.96 | 8.30 | 4.98 | 0.75 | 0.32 | 0.01 | 1.75 | 95 |
| Pr. 49 | 42.42 | 28.34 | 3.94 | 9.22 | 9.84 | 3.54 | 0.71 | 0.49 | 0.02 | 1.48 | 80 |
| Pr. 50 | 41.37 | 29.51 | 3.86 | 9.17 | 8.97 | 3.28 | 0.64 | 0.29 | 0.02 | 2.89 | 70 |
| Pr. 51 | 34.10 | 38.17 | 5.55 | 6.84 | 11.46 | 2.39 | 1.14 | 0.29 | 0.02 | 0.04 | 45 |
| Pr. 52 | 33.63 | 40.89 | 6.04 | 5.05 | 10.53 | 2.75 | 0.78 | 0.28 | 0.02 | 0.04 | 10 |
| Pr. 53 | 50.82 | 21.55 | 5.71 | 9.45 | 8.85 | 2.32 | 0.81 | 0.42 | 0.04 | 0.05 | 20 |

Slag sample 26 contains 0.7 wt % silicon dioxide, despite no silicon dioxide having been added actively to the associated casting powder sample. The reason for this is that a small amount of silicon dioxide was in the refractory material used for melting furnace and crucible, and was able to diffuse during the experiment into the melted casting slag.

TABLE 3

Examples of steel melts used within a contact experiment (steels based on iron, and the major alloying elements in wt %, liquidus temperature T$_{liq}$ in ° C.):

| Steel grade | T$_{liq.}$ | C | Mn | Al | Ti | Composition of laboratory slag |
|---|---|---|---|---|---|---|
| Steel 1 | 1502 | 0.22 | 1.67 | 1.46 | — | Pr. 40 (table 2) |
| Steel 2 | 1420 | 0.40 | 18.80 | 1.20 | — | Pr. 31 (table 2) |
| Steel 3 | 1516 | 0.05 | — | 5.00 | 0.5 | Pr. 48 (table 2) |

What is claimed is:

1. A casting powder, wherein aside from volatile constituents the casting powder comprises:
   40-60% by weight prefused calcium aluminate;
   10-30% by weight fluoride-containing component;
   3-6.5% by weight SiO$_2$;
   5-15% by weight Na$_2$O;
   2-5.5% by weight Li$_2$O;
   less than or equal to 10.5% by weight Al$_2$O$_3$;
   less than or equal to 15% by weight carbon,
   wherein a ratio of CaO to Al$_2$O$_3$ in the prefused calcium aluminate is in a range of 0.6 to 1.1.

2. The casting powder of claim 1 further comprising at least one of
   less than or equal to 5.0% by weight TiO$_2$;
   less than or equal to 5.0% by weight MgO;
   less than or equal to 3.0% by weight MnO;

less than or equal to 1.0% by weight $Fe_2O_3$; or
less than or equal to 1.0% by weight FeO.

3. The casting powder of claim 1 comprising:
40-60% by weight of the prefused calcium aluminate;
15-25% by weight of the fluoride-containing component;
3-6% by weight of the $SiO_2$;
7-12% by weight of the $Na_2O$;
2-5.5% by weight of the $Li_2O$;
less than or equal to 10% by weight of the $Al_2O_3$;
less than or equal to 15% by weight of the carbon;
less than or equal to 3.0% by weight $TiO_2$;
less than or equal to 1.0% by weight MgO;
less than or equal to 1.0% by weight MnO;
less than or equal to 1.0% by weight $Fe_2O_3$; and
less than or equal to 1.0% by weight FeO.

4. The casting powder of claim 1 wherein the fluoride-containing component is $CaF_2$.

5. The casting powder of claim 1 comprising less than or equal to 6.0% by weight of the $SiO_2$.

6. The casting powder of claim 1 further comprising 1.5-3% by weight $TiO_2$.

7. The casting powder of claim 1 comprising 3-5% by weight of the $SiO_2$ and 1.5-3% by weight $TiO_2$.

8. A method of casting steel, the method comprising:
using a casting powder that comprises:
40-60% by weight prefused calcium aluminate,
10-30% by weight fluoride-containing component,
3-6.5% by weight $SiO_2$,
5-15% by weight $Na_2O$,
2-5.5% by weight $Li_2O$,
less than or equal to 10.5% by weight $Al_2O_3$, and
less than or equal to 15% by weight carbon, wherein a ratio of CaO to $Al_2O_3$ in the prefused calcium aluminate is in a range of 0.6 to 1.1.

9. The method of claim 8 wherein the method is a continuous casting method.

10. The method of claim 8 further comprising producing steel with an aluminum content of greater than or equal to 1% by weight.

11. The method of claim 8 further comprising producing steel with a manganese content of greater than or equal to 15% by weight.

12. The method of claim 8 further comprising producing steel with a titanium content of greater than or equal to 0.2 percent by weight.

13. The method of claim 12 wherein the produced steel includes greater than or equal to 1% by weight aluminum and greater than or equal to 0.2% by weight titanium.

* * * * *